(12) United States Patent
Takeuchi et al.

(10) Patent No.: US 8,191,568 B2
(45) Date of Patent: Jun. 5, 2012

(54) FUEL TANK FOR MOTOR VEHICLE

(75) Inventors: Yukiharu Takeuchi, Aichi-ken (JP);
Norihiro Yamada, Aichi-ken (JP);
Hideyuki Tsuzuki, Aichi-ken (JP);
Tomohide Aoki, Aichi Prefecture (JP)

(73) Assignees: Toyoda Gosei Co., Ltd., Aichi-pref.
(JP); FTS Co., Ltd., Aichi-pref. (JP)

( * ) Notice: Subject to any disclaimer, the term of this patent is extended or adjusted under 35 U.S.C. 154(b) by 634 days.

(21) Appl. No.: 12/382,312

(22) Filed: Mar. 13, 2009

(65) Prior Publication Data

US 2009/0230133 A1      Sep. 17, 2009

(30) Foreign Application Priority Data

Mar. 14, 2008   (JP) .................................. 2008-065447
Dec. 25, 2008   (JP) .................................. 2008-330016

(51) Int. Cl.
*F16K 43/00*       (2006.01)
(52) U.S. Cl. ........................................ 137/316; 137/590
(58) Field of Classification Search ............. 137/565.17, 137/590, 583, 589, 587, 316; 220/562–564, 220/4.12–4.14; 264/536, 278
See application file for complete search history.

(56) References Cited

U.S. PATENT DOCUMENTS

| | | | | |
|---|---|---|---|---|
| 5,182,032 | A * | 1/1993 | Dickie et al. | 249/91 |
| 6,612,458 | B2 * | 9/2003 | Balzer et al. | 220/562 |
| 6,712,234 | B2 * | 3/2004 | Boecker | 220/563 |
| 6,978,802 | B2 * | 12/2005 | Hagano et al. | 137/574 |
| 2002/0063129 | A1 * | 5/2002 | Potter et al. | 220/4.13 |
| 2004/0129708 | A1 * | 7/2004 | Borchert et al. | 220/562 |
| 2007/0095840 | A1 * | 5/2007 | Gerhardt et al. | 220/562 |

FOREIGN PATENT DOCUMENTS

| | | | |
|---|---|---|---|
| JP | A-01-301227 | * | 12/1989 |
| JP | A-06-143396 | * | 5/1994 |
| JP | H10-71861 | * | 3/1998 |
| JP | A-2006-264372 | * | 10/2006 |

OTHER PUBLICATIONS

Machine Translation of JP-A-06-143396.*
Machine Translation of JP-A-2006-264372.*
Machine Translation of JP H10-71861.*

* cited by examiner

*Primary Examiner* — Stephen M Hepperle
*Assistant Examiner* — Jessica Cahill
(74) *Attorney, Agent, or Firm* — Posz Law Group, PLC

(57) ABSTRACT

A fuel tank capable of attaching functional parts and tubes in an interior thereof. In a fuel tank for a motor vehicle, which is formed by blow molding for attachment of a built-in part in an interior thereof, and of which an outer wall composed of a synthetic resin has an opening, a functional part adapted to discharge fluid from the interior of the fuel tank or feed fluid therein is attached to the built-in part, a tube adapted to discharge fluid from the interior of the fuel tank or feed fluid therein is connected to the functional part, and a tube connector is attached to an end of the tube. A temporal holding connector is formed integrally with the built-in part, the tube connector is attached to the temporal holding connector, and after blow molding, the tube connector is detached from the temporal holding connector and is attached to a tank cap adapted to close the opening of the fuel tank.

12 Claims, 12 Drawing Sheets

FUEL TANK FOR MOTOR VEHICLE

CROSS-REFERENCE TO RELATED APPLICATION

This application is related to and claims priority from Japanese patent application No. 2008-065447 and Japanese patent application No. 2008-330016, incorporated herein by reference.

BACKGROUND OF THE INVENTION

1. Field of the Invention

The present invention relates to a fuel tank composed of a thermoplastic synthetic resin and, more particularly, to a fuel tank having built-in parts and valves with tubes, of which an outer wall is formed by subjecting a thermoplastic synthetic resin member to blow molding.

2. Description of Related Art

Conventionally, fuel tanks for motor vehicles, etc. have been formed of metal. But, recently, fuel tanks formed of a thermoplastic synthetic resin have been frequently used, because it is lightweight, free from rust, and readily formed into a desired configuration.

In many cases, the fuel tanks formed of thermoplastic synthetic resin have been produced with the blow molding method, because tubular bodies can be readily formed therewith. With the blow molding method, a cylindrical-shaped parison composed of a molten synthetic resin is extruded into a mold from the upper side thereof, and air is blown into the parison while holding the parison with the mold.

On the other hand, upon blow molding, there are the cases where fuel gas generated inside the fuel tank must be discharged outside thereof, and air must be introduced inside thereof, because the inside pressure of the fuel tank becomes negative. In such cases, in order to prevent fuel that is liquid from flowing out of the fuel tank, valves have been provided inside the fuel tank, along with tubes and discharge holes adapted to discharge gas outwardly.

As shown in FIG. 1, in order to discharge gas, tubes 10 having valve units 12 and baffle plates 14 are provided within a fuel tank 16 made of metal (see publication of unexamined Japanese patent application No. 2006-264372, for example.).

Since the fuel tank 16 is made of metal so that the tubes, etc. are held with holding members provided inside the fuel tank by welding, but it has been difficult to provide holding members inside the fuel tank composed of a synthetic resin, which has been made with blow molding.

And, as shown in FIG. 2, in order to provide a fuel pump 18 and a valve 20 within a fuel tank 22, a synthetic resin plate 24 to which the fuel pump 18 and the valve 20 are attached is inserted in a parison 26, and the synthetic resin plate 24 held with the parison 26 is subjected to blow molding, and as a result, the fuel pump 18 and the valve 20 are attached within the fuel tank 22 (see publication of unexamined Japanese patent application No. Hei1-301227, for example.).

In this case, the synthetic resin plate 24 to which the fuel pump and valves are attached is fixed to a resin frame and secured to an inner surface of an outer wall of the fuel tank so as to require a detaching step of the resin frame after blow molding. Accordingly, it has been demanded to secure the fuel pump and valves to the outer wall of the fuel tank directly, and form an outlet hole, and consequently, the construction of the synthetic resin plate 24 becomes complicated, whereby the attaching positions of the fuel pump and valves are also limited to specific positions.

On the other hand, there are the cases where a built-in part having column members adapted to increase the strength of the fuel tank upon blow molding is provided therein (see publication of unexamined Japanese patent application No. Hei6-143396, for example.).

In this case, however, where valves, tubes, etc. are attached to the built-in part, the tubes may contact a molten parison during blow molding because the tubes attached to the valves exhibit flexibility, and as a result, the tubes may be adhered to the parison. And, dust and dirt may intrude into tubes during the molding step, and consequently, caps must be attached to open ends of the tubes, thereby decreasing the productivity.

SUMMARY OF THE INVENTION

Accordingly, it is an object of the present invention to provide a fuel tank capable of readily attaching functional parts such as valves, and tubes in an interior thereof.

According to a first aspect of the present invention, in a fuel tank for a motor vehicle, which is formed by blow molding for attachment of a built-in part in an interior thereof, and of which an outer wall is composed of a synthetic resin and an opening, a functional part adapted to discharge fluid from the interior of the fuel tank or feed fluid therein is attached to the built-in part, a tube adapted to discharge fluid from the interior of the fuel tank or feed fluid therein is connected to the functional part, a tube connector is attached to an end of the tube, and a temporal holding connector is formed integrally with the built-in part such that the tube connector is attached to the temporal holding connector, and after blow molding, the tube connector is detached from the temporal holding connector and is attached to a tank cap adapted to close the opening of the fuel tank or a fuel pump adapted to be assembled to the opening of the fuel tank.

According to the first aspect, since the functional part adapted to discharge fluid from the interior of the fuel tank or feed fluid therein is attached to the built-in part, the strength of the fuel tank is improved with the built-in part, and the functional part as well as the built-in part can be attached to the interior of the fuel tank simultaneously with blow molding to facilitate the attachment thereof, and by virtue of the functional part, only fluid can be discharged from the fuel tank, or fed therein.

Since the tube adapted to discharge fluid from the interior of the fuel tank or feed fluid therein is connected to the functional part, by virtue of the functional part, fluid can be discharged from the fuel tank and fluid can be fed from the exterior of the fuel tank.

Since the tube connector is attached to an end of the tube, the tube connector can be securely attached to a connector provided in a predetermined position of the fuel tank, whereby fluid can be discharged from or fed in the fuel tank.

The temporal holding connector is formed integrally with the built-in part, and the tube connector is attached to the temporal holding connector. Therefore, the temporal holding connector can be formed with the formation of the built-in part, thereby facilitating the production thereof without requiring trouble for assembling the temporal holding connector so that the productivity is improved.

Since the tube connector is attached to the temporal holding connector, during blow molding, the end of the tube can be held with the temporal holding connector, whereby the tube can be prevented from contacting a parison. The end of the tube connector can be closed with the temporal holding connector so that dust and dirt can be prevented from intruding therein.

After blow molding, the tube connector is removed from the temporal holding connector, and the tube connector is attached to a tank cap adapted to close the opening of the fuel tank, or a fuel pump adapted to be assembled to the opening of the fuel tank. Therefore, after blow molding, it is easy to detach the tube connector, and attach the same to the tank cap or the fuel pump. The fluid flowing out via the functional part can be discharged out of the fuel tank, and air can be fed from the exterior of the fuel tank.

According to a second aspect of the present invention, the built-in part has a plurality of column members adapted to be fused to an inner surface of an outer wall of the fuel tank, thereby attaching the built-in part thereto, and beam members adapted to connect the column members integrally, and the functional part is attached to an upper part of the column member.

According to the second aspect of the present invention, since the built-in part has a plurality of column members adapted to be fused to the inner surface of the outer wall of the fuel tank for attaching the built-in part, the built-in part can be held with the column members in a plurality of positions of the inner surface of the outer wall of the fuel tank, the rigidity of the fuel tank is enhanced, thereby restraining expansion and deformation of the fuel tank due to variations of internal pressure thereof, and improving durability against shocks and vibrations.

Since the beam members integrally connected to the column members are provided, the column members and the beam members can be made integral, and consequently, it is easy to attach the built-in part in the interior of the fuel tank while holding the same with blow molding.

Since the functional part is attached to an upper part of the column member, fluid can be readily discharged from the fuel tank via the functional part and the tube.

According to a third aspect of the present invention, the temporal holding connector has a connecting section adapted to be connected to the beam member of the built-in part, and a tube attaching section in which the tube connector extending from the connecting section is adapted to be inserted. The tube connector has a seal ring in an interior thereof, and the tube connector has a flat part in an outer surface of the tube attaching section in a longitudinal direction thereof along a parting line (PL), which contacts the seal ring when the tube connector is attached to the temporal holding connector.

According to the third aspect of the present invention, since the temporal holding connector has a connecting section adapted to be connected to the beam member of the built-in part, and a tube attaching section in which the tube connector extending from the connecting section is adapted to be inserted, the tube connector can be held in the position separated from the beam member by a predetermined distance.

The tube connector has a seal ring in an interior thereof, and the tube connector has a flat part in an outer surface of the tube attaching section in a longitudinal direction thereof along a parting line (PL), which contacts the seal ring when the tube connector is attached to the temporal holding connector. Therefore, the parting line (PL) does not protrude from the outer surface of the tube attaching section, and when the tube connector is attached, the seal ring provided in the interior of the tube connector does not contact the rib of the parting line (PL) so that the seal ring is not deformed, whereby when the tube connector is attached to the tank cap, the sealing properties between the tank cap and the tube connector can be ensured.

According to a fourth aspect of the present invention, the temporal holding connector has a connecting section adapted to be connected to the beam member of the built-in part, and a tube attaching section in which the tube connector extending from the connecting section is adapted to be inserted, the tube connector has a seal ring in an interior thereof, and the temporal holding connector has a groove in the tube attaching section, which does not contact the seal ring when the tube connector is attached to the temporal holding connector.

According to the fourth aspect, since the temporal holding connector has the connecting section adapted to be connected to the beam member of the built-in part, and the tube attaching section in which the tube connector extending from the connecting section is adapted to be inserted, the tube connector has the seal ring in an interior thereof, and the tube connector has the groove in the tube attaching section, which does not contact the seal ring when the tube connector is attached to the temporal holding connector, the seal ring does not contact an open end of the groove of the tube attaching section so as not to be deformed, thereby ensuring the sealing properties between the tank cap and the tube connector when the tube connector is attached to the tank cap.

According to the fifth aspect of the present invention, the tube attaching section is provided in generally parallel to the longitudinal direction of the beam member.

According to the fifth aspect of the present invention, since the tube attaching section is provided in generally parallel to the longitudinal direction of the beam member, the tube connector can be detached in the direction generally parallel to the beam member, whereby it is easy to detach the tube connector from the temporal holding connector after molding the fuel tank.

According to a sixth aspect of the present invention, the opening is an attaching hole adapted to attach a fuel pump provided in the fuel tank, an inside tube attaching section adapted to attach the tube connector is formed in an inner surface of the tank cap, and an outside tube attaching section interconnected with the inside tube attaching section and projecting from the outer surface of the tank cap is formed.

According to the sixth aspect of the present invention, since the opening is the attaching hole adapted to attach the fuel pump provided in the fuel tank, the opening area thereof is large so that the tube connector can be removed from the temporal holding connector and attached to the tank cap by inserting hands via the opening. The opening can be closed simultaneously with the attachment of the fuel pump, whereby the assembling thereof is easy.

The inside tube attaching section for attachment of the tube connector is formed in the inner surface of the tank cap, and the outside tube attaching section interconnected with the inside tube attaching section and projecting from the outer surface of the tank cap is formed. Therefore, where the tube connector detached from the temporal holding connector is attached to the inside tube attaching section, the fluid can be discharged from the fuel tank by attaching the tube which is interconnected with a canister, etc. to the outside tube attaching section.

According to a seventh aspect of the present invention, the functional part is a valve, and the valve is attached to two positions on both sides of the fuel tank in a longitudinal or a widthwise direction thereof, two valves are connected to each other with a tube, and another tube to which the tube connector is attached at an end thereof is attached to one of the two valves.

According to the seventh aspect of the present invention, since the valve is attached to two positions on both sides of the fuel tank in the longitudinal or the widthwise direction thereof, in the case where fuel waves in the fuel tank due to the inclining of a vehicle body and vibrations thereof, and consequently, one valve is closed, one of two valves can open, thereby enabling the discharging of fluid from the fuel tank at any time so as to maintain the fluid pressure in the fuel tank constant.

Since the two valves are connected to each other with a tube, and another tube to which the tube connector is attached at an end thereof is attached to one of the two valves, in the case where one of the two valves is opened, fluid can be fed to the tube connector via the tube connected thereto, and consequently, fluid can be discharged from, or flowed in the fuel tank.

According to an eighth aspect of the present invention, the functional part is a valve, and the valve is attached to the built-in part so as to be located on an upper side of the fuel tank.

According to the eighth aspect of the present invention, since the valve is attached to the built-in part so as to be located on the upper side of the fuel tank, fluid can be readily discharged to an exterior of the fuel tank via the valve and the tube.

According to a ninth aspect of the present invention, the functional part is a valve, and the valve is composed of polyamide or polyacetal, the tube is composed of polyamide, and the fuel tank is mainly composed of a high density polyethylene (HDPE).

According to the ninth aspect of the present invention, since the valve is composed of polyamide or polyacetal, and the tube is composed of polyamide, in the case where they are mounted inside the fuel tank, they can maintain their strength. Since the fuel tank is mainly composed of a high density polyethylene (HDPE), it exhibits great shock resistance and excellent fuel oil resistance.

Since the temporal holding connector is integrally formed in the built-in part, and the tube connector is attached to the temporal holding connector, the end of the tube can be held with the temporal holding connector during blow molding so that the tube can be prevented from contacting a parison. The end of the tube connector is closed with the temporal holding connector, and consequently, intrusion of dust and dirt can be prevented.

Since the tube connector is arranged to be detached from the temporal holding connector after blow molding, and to be attached to the tank cap, it is easy to detach the tube connector after blow molding, and attach the same to the tank cap.

Other objects, features, and characteristics of the present invention will become apparent upon consideration of the following description and the appended claims with reference to the accompanying drawings, all of which form a part of this specification.

DETAILED DESCRIPTION OF THE PREFERRED EMBODIMENTS

Hereinafter, embodiments of a fuel tank in accordance with the present invention will be explained with reference to FIGS. 3 through 23. FIG. 3 through FIG. 13 show a first embodiment of the present invention, FIG. 14 through FIG. 21 show a second embodiment of the present invention, and FIG. 23 shows a third embodiment of the present invention.

Figure 1:
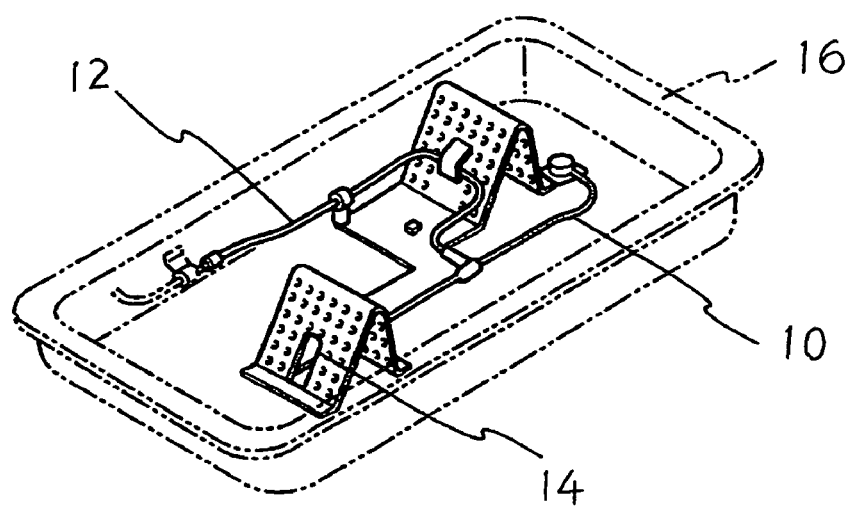
FIG. 1 is a perspective view of an upper tank to which baffle plates are attached, which is produced with a conventional method for producing a fuel tank to an upper tank shows a conventional method for producing a fuel tank.
Figure 2:
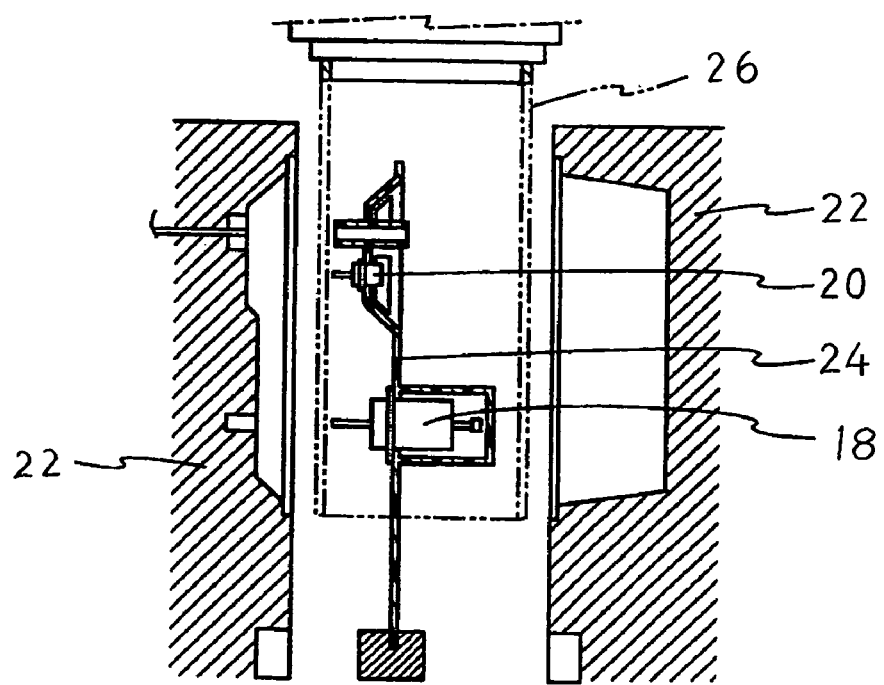
FIG. 2 is a sectional view of a blow molding device used in a conventional method for producing a fuel tank, in which a mold is in the open state.
Figure 3:
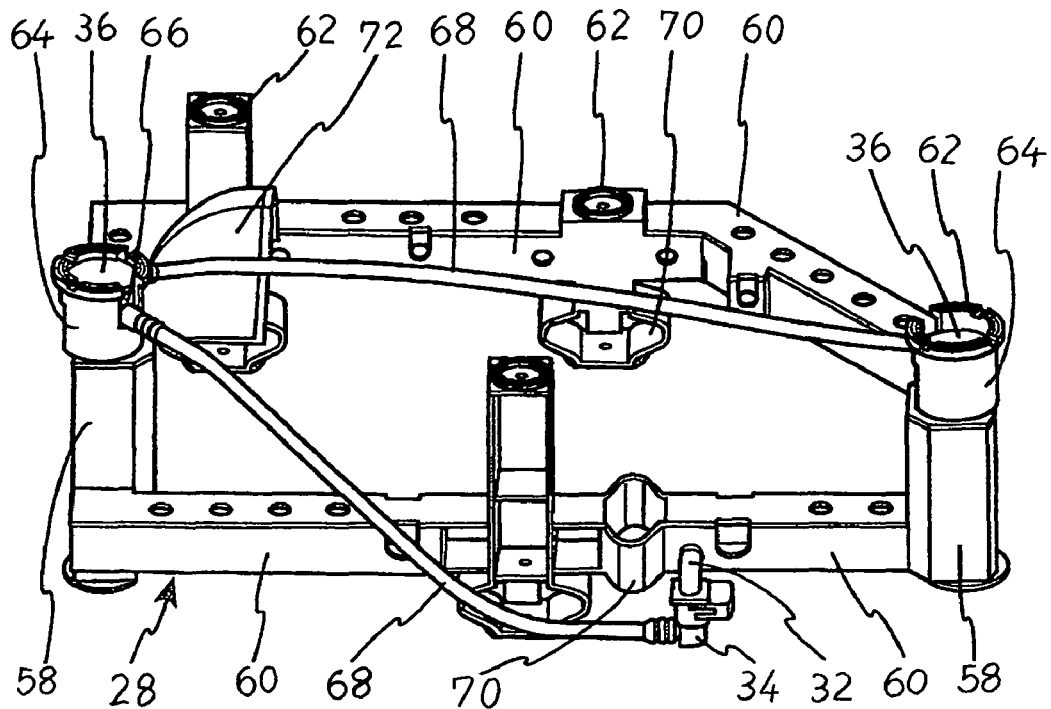
FIG. 3 is a perspective view of a built-in part adapted to be attached inside a fuel tank in a first embodiment of the present invention.
Figure 4:
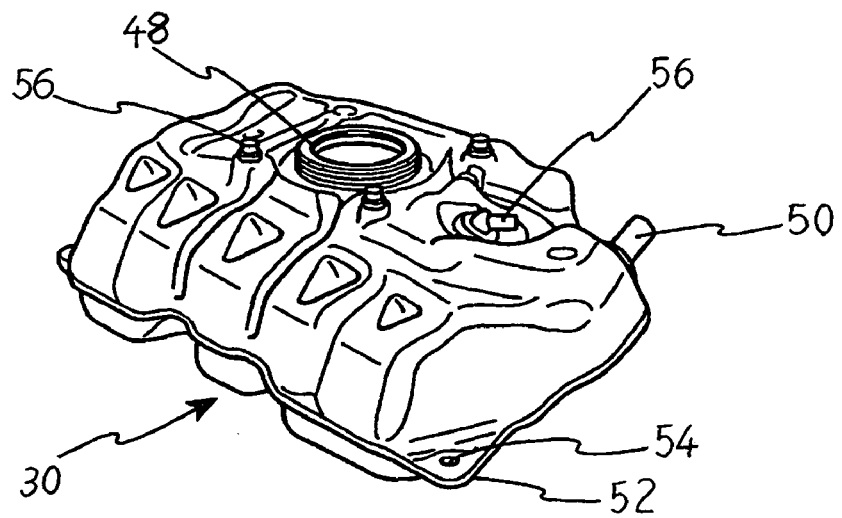
FIG. 4 is a perspective view of a fuel tank in accordance with the present invention.

FIG. 3 is a perspective view of a built-in part 28 adapted to be attached inside a fuel tank 30 in the first embodiment, and FIG. 4 is a perspective view of the fuel tank 30 in the first embodiment.

Figure 5:
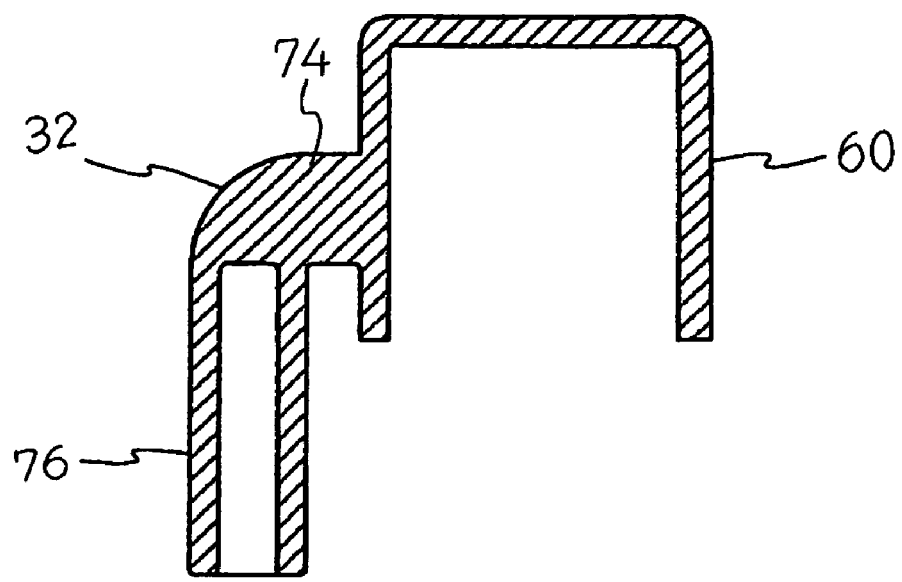
FIG. 5 is a sectional view of a temporal holding connector provided in the built-in part in the first embodiment of the present invention.
Figure 6:
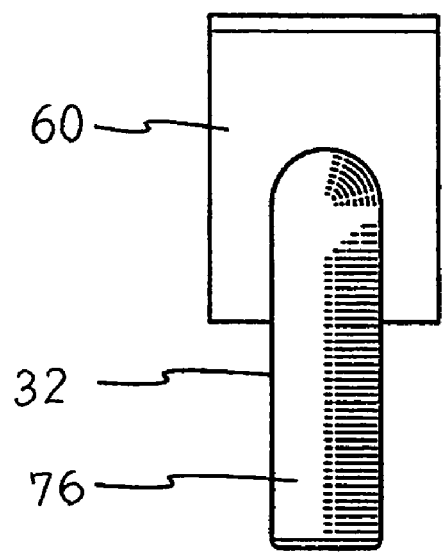
FIG. 6 is a front view of the temporal holding connector provided in the built-in part in the first embodiment of the present invention.
Figure 7:
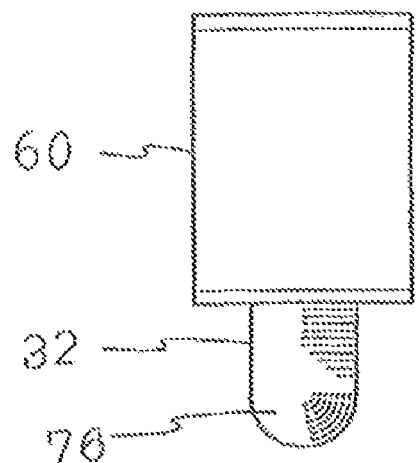
FIG. 7 is a plan view of the temporal holding connector provided in the built-in part in the first embodiment of the present invention.

FIG. 5 through FIG. 7 show a temporal holding connector 32 provided in the built-in part 28 of the first embodiment of the present invention, FIG. 5 is a sectional view of the temporal holding connector 32, FIG. 6 is a front view thereof, and FIG. 7 is a plan view thereof.

Figure 8:
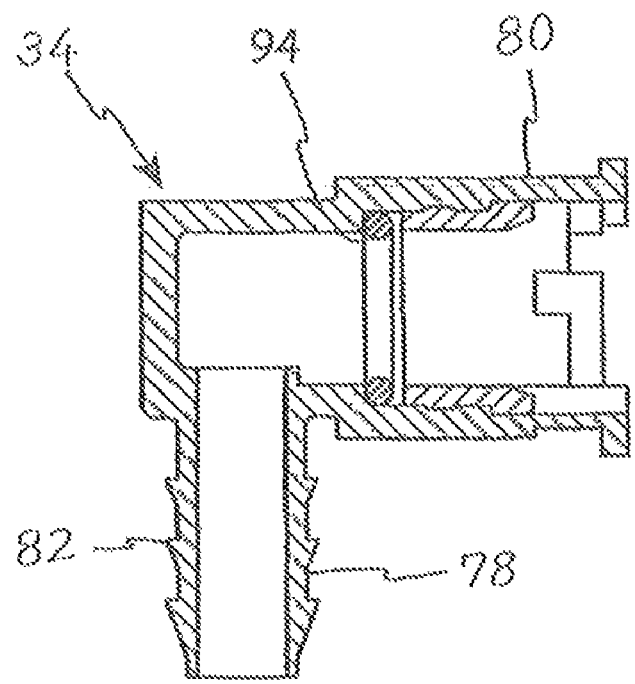
FIG. 8 is a sectional view of a tube connector in the first embodiment of the present invention.
Figure 9:
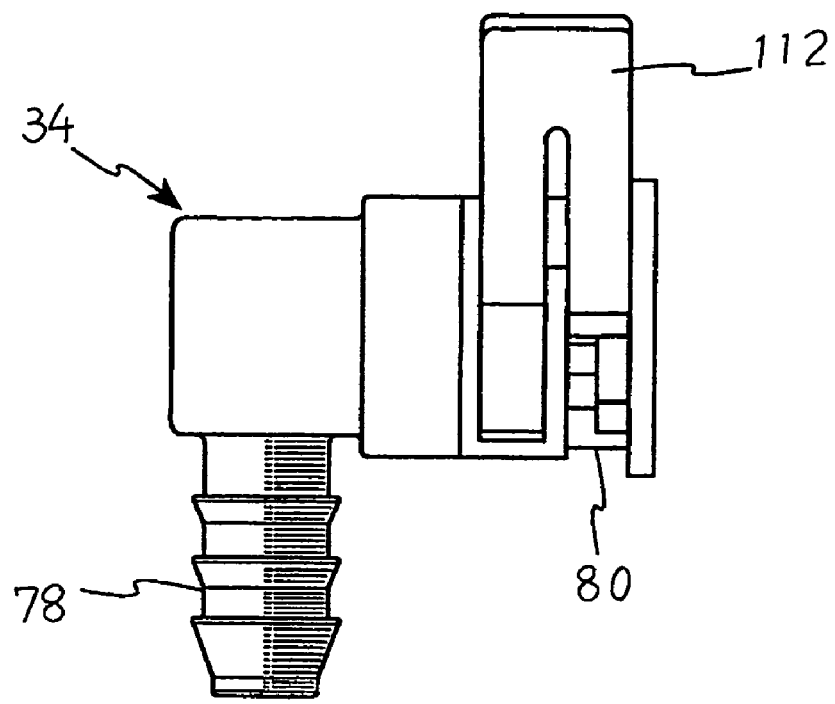
FIG. 9 is a side view of the tube connector in the first embodiment of the present invention.
Figure 10:
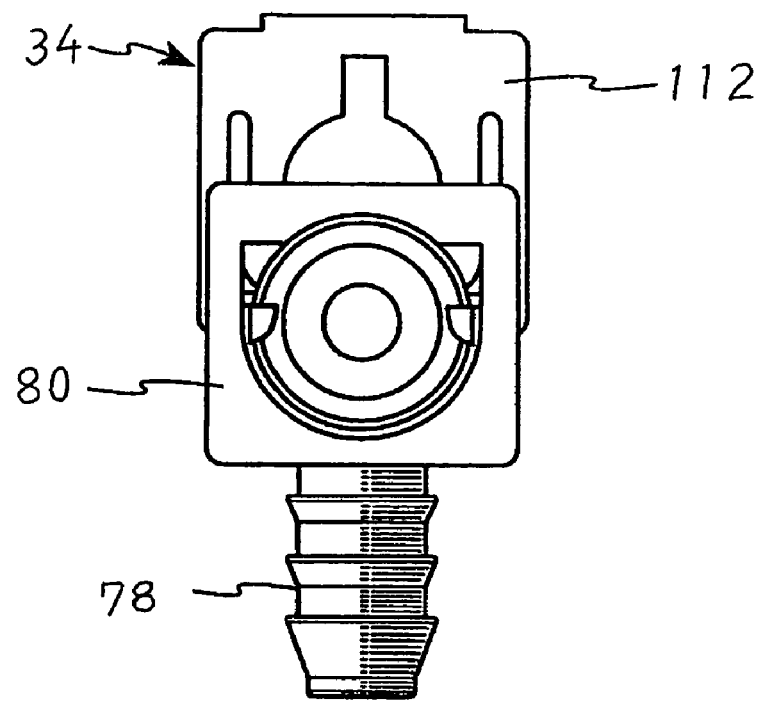
FIG. 10 is a front view of the tube connector in the first embodiment of the present invention.

FIG. 8 through FIG. 10 show a tube connector 34 in the first embodiment of the present invention, FIG. 8 is a sectional view of the tube connector 34, FIG. 9 is a side view thereof, and FIG. 10 is a front view thereof.

Figure 11:
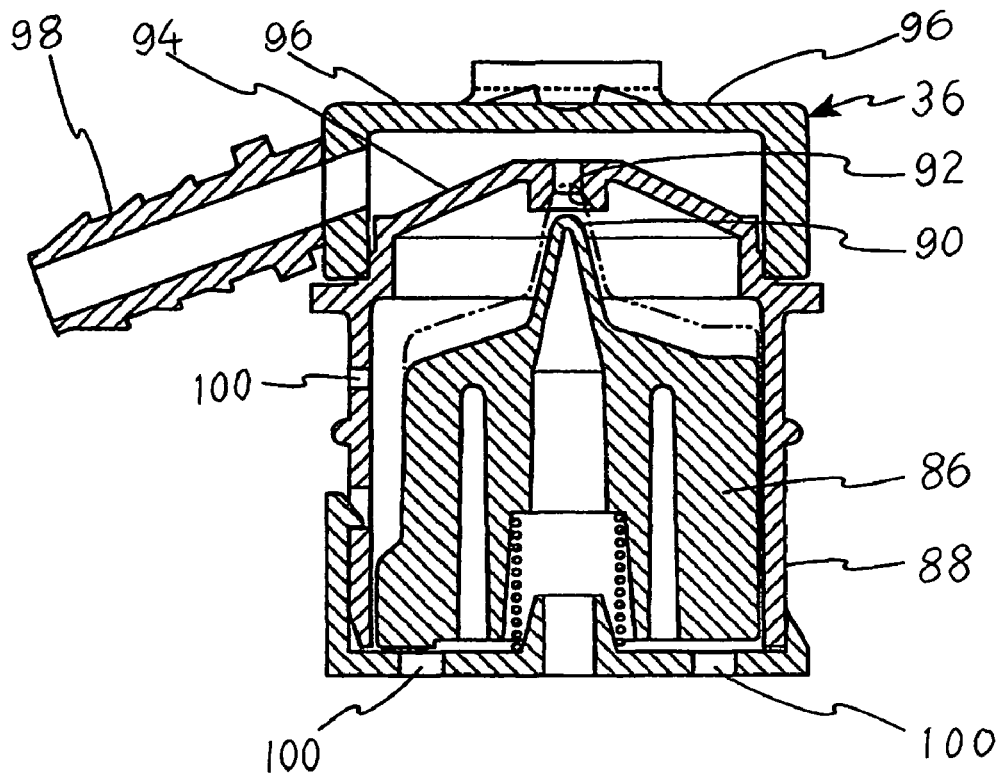
FIG. 11 is a sectional view of a valve in accordance with the present invention.
Figure 12:
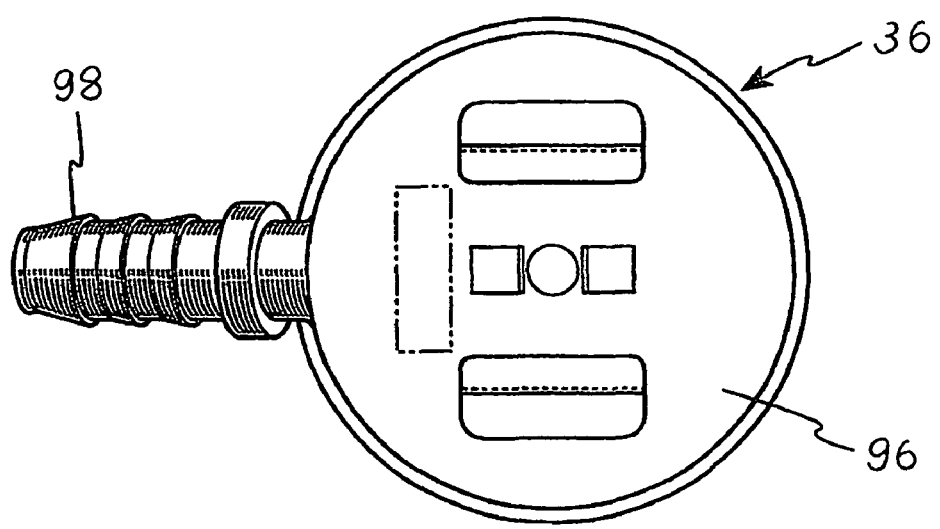
FIG. 12 is a front view of the valve in accordance with the present invention.
Figure 13:
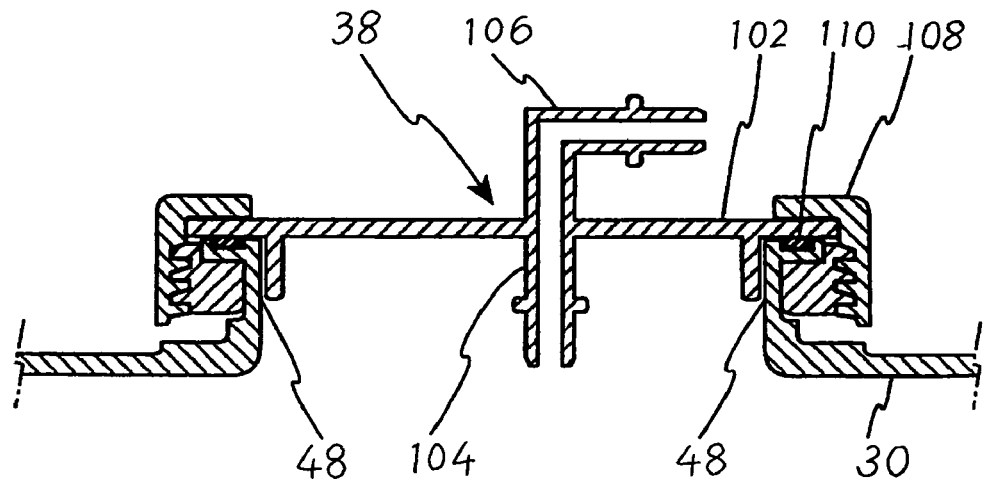
FIG. 13 is a sectional view of a tank cap in accordance with the present invention.

FIG. 11 and FIG. 12 show a valve 36 in the first embodiment of the present invention, FIG. 11 is a sectional view of the valve 36, and FIG. 12 is a front view thereof, and FIG. 13 is a sectional view of a tank cap 38.

Figure 14:
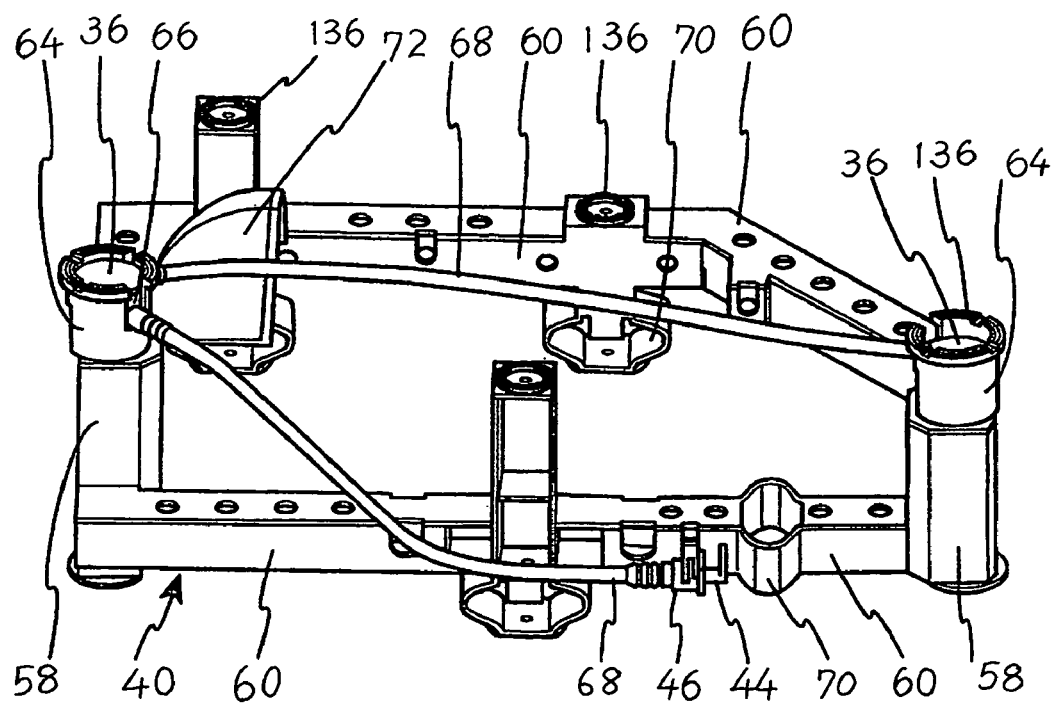
FIG. 14 is a perspective view of a built-in part adapted to be attached inside a fuel tank in a second embodiment of the present invention.

FIG. 14 and FIG. 12 show a valve 36 in the first embodiment of the present invention, FIG. 11 is a sectional view of the valve 36, and FIG. 12 is a front view thereof, and FIG. 13 is a sectional view of a tank cap 38.

FIG. 11 and FIG. 12 show a valve 36 in the first embodiment of the present invention, FIG. 11 is a sectional view of the valve 36, and FIG. 12 is a front view thereof, and FIG. 13 is a sectional view of a tank cap 38.

FIG. 14 is a perspective view of a built-in part 40 adapted to be attached inside a fuel tank 42 in a second embodiment.

Figure 15:
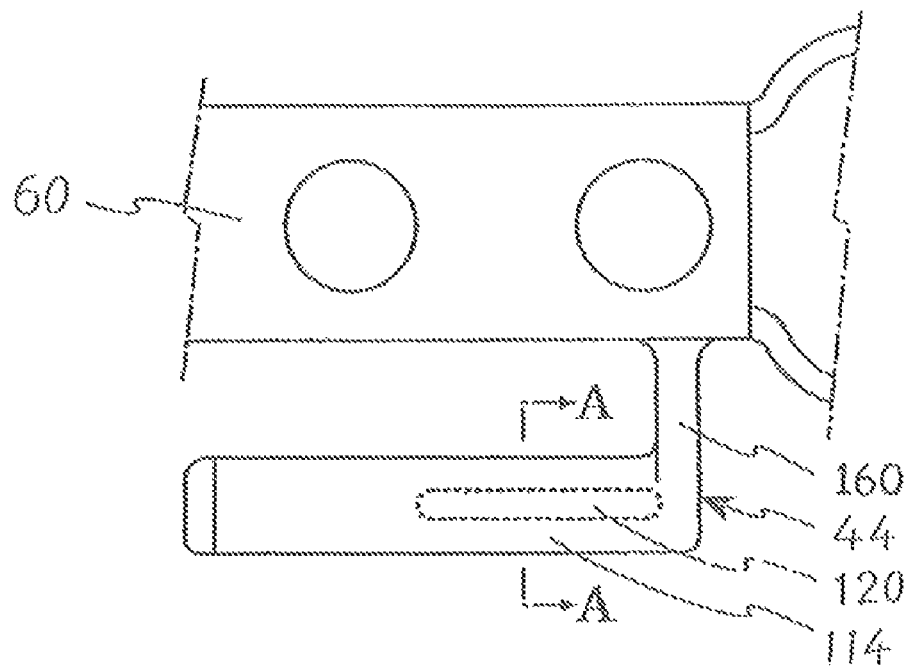
FIG. 15 is a partially cut away front view of a temporal holding connector provided in the built-in part in the second embodiment of the present invention.
Figure 16:
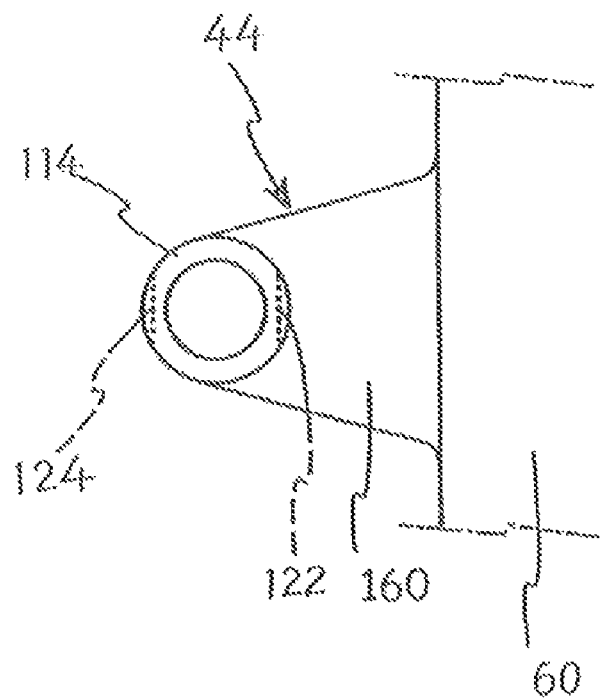
FIG. 16 is a side view of the temporal holding connector provided in the built-in part in the second embodiment of the present invention.
Figure 17:
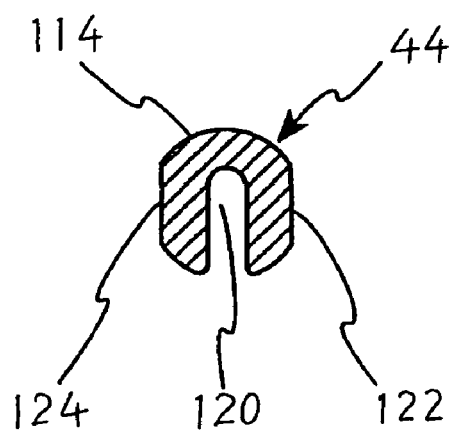
FIG. 17 is a sectional view of the temporal holding connector provided in the built-in part in the second embodiment of the present invention, taken along line A-A of FIG. 15.

FIG. 15 through FIG. 17 show a temporal holding connector 44 in the second embodiment of the present invention, FIG. 15 is a front view of the temporal holding connector 44, FIG. 16 is a side view thereof, and FIG. 17 is a sectional view thereof.

Figure 18:
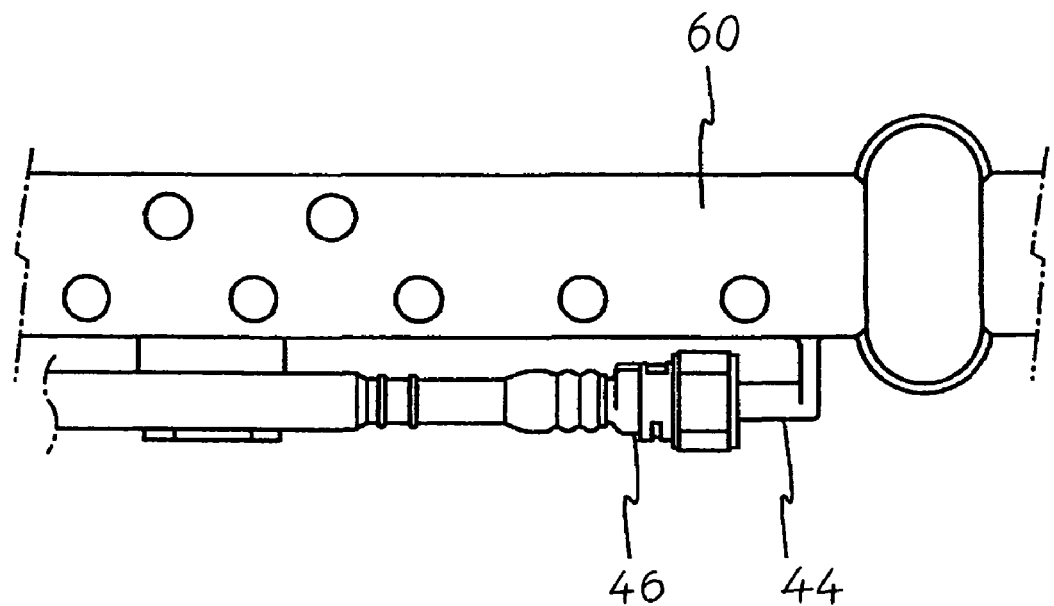
FIG. 18 is a front view of a tube connector in the second embodiment of the present invention, which is attached to the temporal holding connector.
Figure 19:
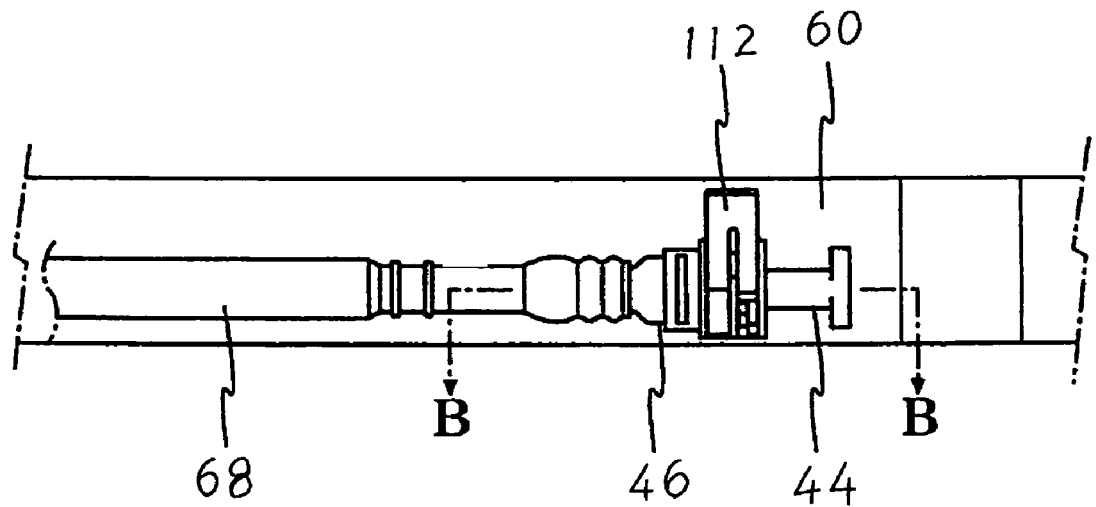
FIG. 19 is a side view of the tube connector in the second embodiment of the present invention, which is attached to the temporal holding connector.
Figure 20:
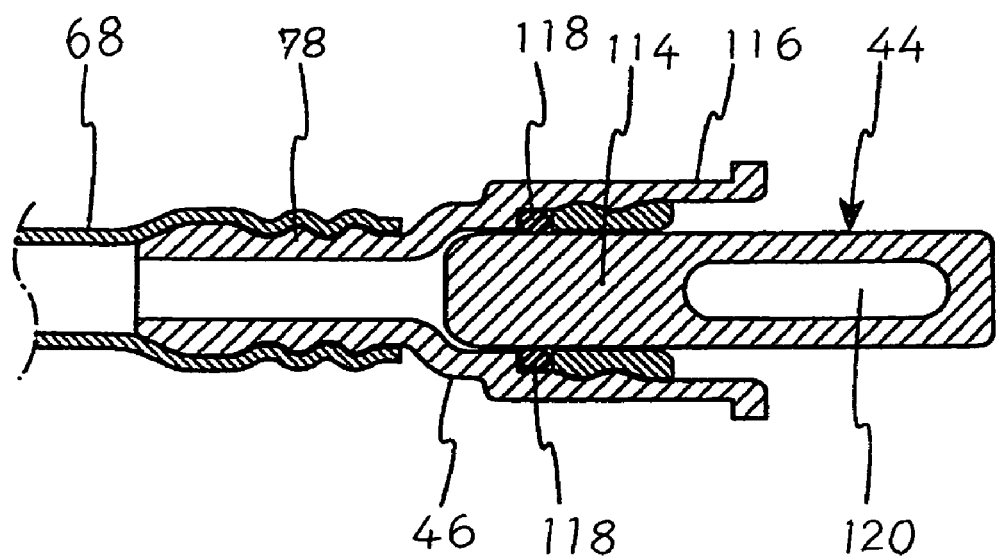
FIG. 20 is a sectional view of the tube connector in the second embodiment of the present invention, which is attached to the temporal holding connector, taken along line B-B of FIG. 19.
Figure 21:
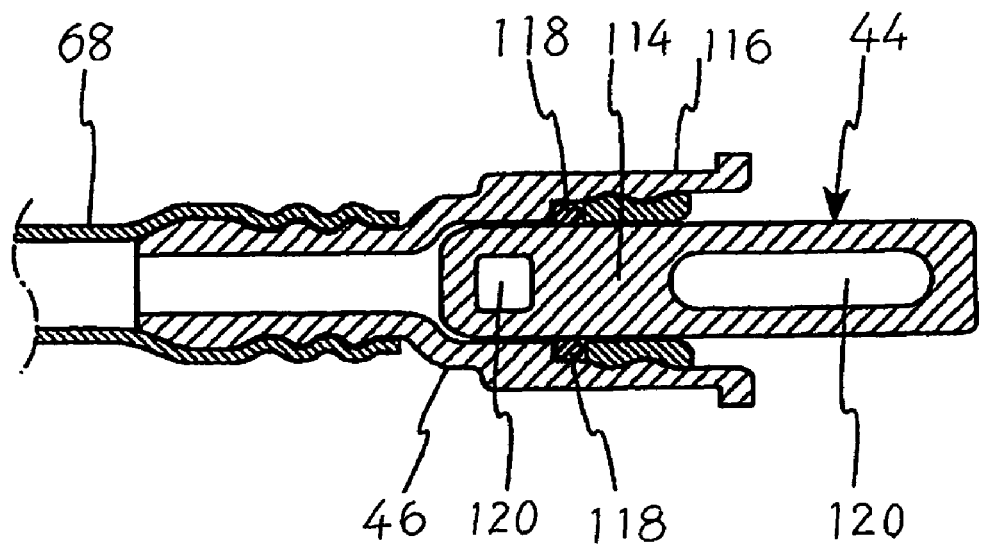
FIG. 21 is a sectional view of the tube connector in the second embodiment of the present invention, which is attached to another temporal holding connector, taken along line B-B of FIG. 19.

FIG. 18 through FIG. 21 are views showing the state in which a tube connector 46 is attached to the temporal holding connector 44 in the second embodiment, FIG. 18 is a plan view of an attaching portion of the tube connector 46, FIG. 19 is a front view thereof, and FIGS. 20 and 21 are sectional views thereof.

Figure 22:
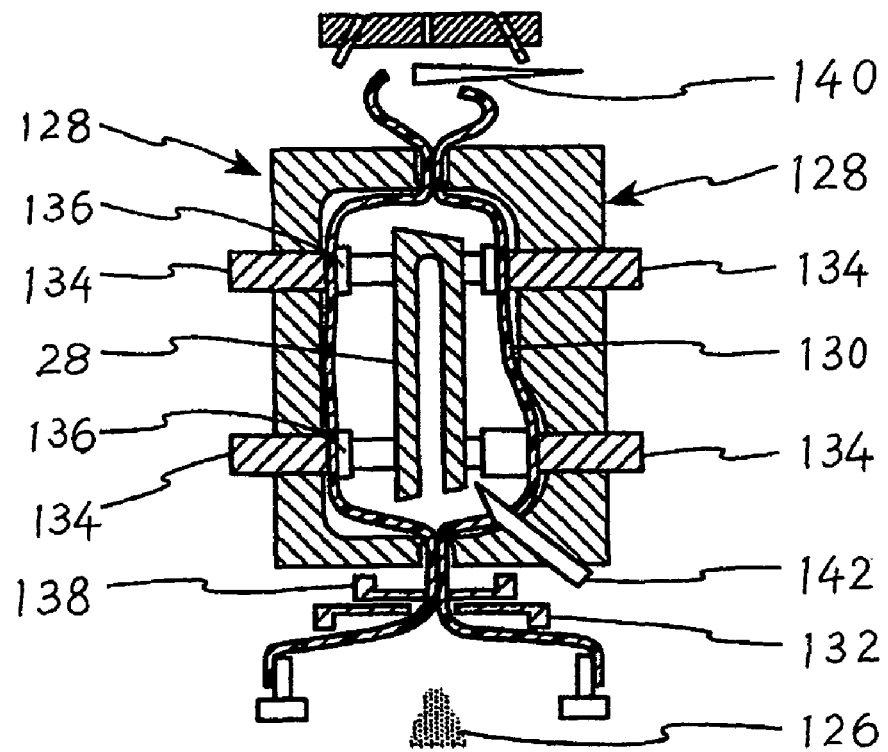
FIG. 22 is a sectional view of a blow molding mold in the closed state, which shows the method for producing a fuel tank in accordance with the present invention.
Figure 23:
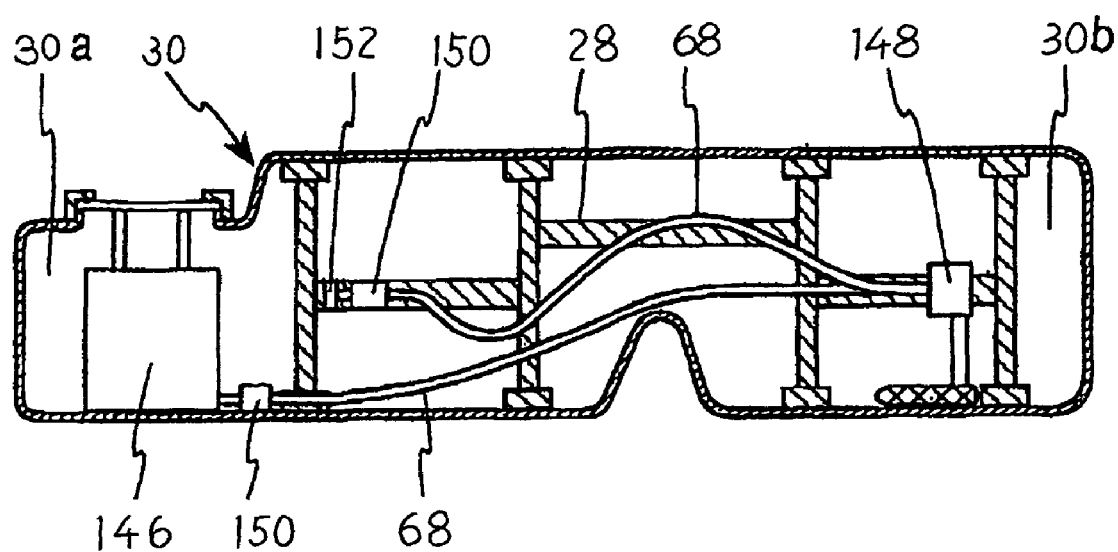
FIG. 23 is a sectional view of a third embodiment of a fuel tank in accordance with the present invention.

FIG. 22 is a sectional view of a blow molding device for subjecting the fuel tank to blow molding, and FIG. 23 is a sectional view of a fuel tank in a third embodiment.

In the first embodiment, as shown in FIG. 4, a pump unit attaching port 48 adapted to attach a fuel pump (not shown) to the fuel tank 30 is formed in an upper surface of the fuel tank 30. And a fuel inlet port 50 adapted to inject fuel fed from an inlet pipe (not shown) is formed in a side surface or the upper surface of the fuel tank 30.

And a rib 52 is formed over an entire circumference of the fuel tank 30 and attaching holes 54 are formed at predetermined positions of the rib 52, such as corners thereof. The fuel tank 30 is secured to a vehicle body by bolting the attaching holes 52 and the vehicle body together.

In addition, attaching holes 56 adapted to attach hoses, etc. are formed in the upper surface of the fuel tank 30.

In the present embodiment, the fuel tank 30 is formed by blow molding, and an outer wall thereof includes an outermost layer, an outer main layer, an outer adhesive layer, a barrier layer, an inner adhesive layer and an inner main layer.

Upon blow molding, the parison composed of the above-described six layers is used. A parison composed of more than six layers can be also used. And, the outermost layer is used in the case where recycled materials, fillers, etc. are mixed in the outer main layer, but the outermost layer may be omitted.

The outermost layer and the outer main layer are composed of a thermoplastic synthetic resin exhibiting great shock resistance and maintaining rigidity against a fuel oil, and it is preferable to form them of a high density polyethylene (HDPE). Where the outer main layer contains an inorganic filler, the surface of the outer main layer is covered with the outermost layer, and in this case, the inorganic filler is not exposed, whereby the surface of the fuel tank can be made smooth.

A preferable example of the high density polyethylene (HDPE) used in the outermost layer, the outer main layer and the inner main layer is the polyethylene having a melt mass-flow rate (MRF: 21.6 kg/10 min) of 5 through 7, and a density ($g/cm^3$) of 0.944 through 0.950.

The barrier layer is composed of a thermoplastic synthetic resin allowing the permeation of only an extremely small amount of fuel oil. Examples of the thermoplastic synthetic resin composing the barrier layer include copolymer of ethylene vinyl alcohol (EVOH), polybutylene terephthalate, polyethylene terephthalate, polyphenylene sulfide (PPS), liquid crystalline polymer (LCP), and polyphthalamide (PPA), but copolymer of ethylene vinyl alcohol (EVOH) is preferable.

By virtue of the barrier layer, fuel oil such as gasoline, etc. permeated through the inner main layer can be blocked, and consequently, the evaporation of the fuel oil in air can be blocked.

The outer adhesive layer is provided between the outer main layer and the barrier layer to bond these two layers to each other, and the inner adhesive layer is provided between the inner main layer and the barrier layer to bond these two layers to each other.

Examples of the thermoplastic synthetic resin exhibiting adhesive properties, which is used in both the outer adhesive layer and the inner adhesive layer include a modified polyolefin resin, unsaturated carboxylic acid modified polyolefin resin, and particularly unsaturated carboxylic acid modified polyethylene resin, are preferable. This can be manufactured by subjecting polyolefin resin to copolymerization or graft-polymerization with unsaturated carboxylic acid.

The inner main layer is composed of a high density polyethylene (HDPE) that is a material equal to that for the outermost layer, as disclosed in connection with the outermost layer.

Within the fuel tank 30, the built-in part 28 (FIG. 3) is attached. The attaching method of the built-in part 28 will be explained later.

Hereinafter, the built-in part 28 will be explained with reference to FIG. 3. The built-in part 28 has a plurality of column members 58, each supporting an outer wall of the fuel tank 30 from an inner side thereof upwardly and downwardly, and beam members 60 connecting the column members 58 to each other.

Upper surfaces of ends of the column members 58, which contact inner surfaces of the outer wall of the fuel tank 30, define contacting sections 62, each having a projection along a circumference thereof. And upper sections of the column members 58 which are located on both side ends of the built-in part 28 define valve attaching sections 64 adapted to accommodate later-describing valves 30. The contacting sections 62 are also defined with upper surfaces of the valve attaching sections 64.

The valve attaching section 64 has a cylindrical configuration, and a valve 36 is accommodated therein. A notch 66 is provided in one part thereof, and a tube 68 attached to the valve 36 extends via the notch 66.

The column members 58 are secured to predetermined positions inside the fuel tank 30, and during blow molding, the contacting sections 62 are fused so as to be jointed to the inner surface of the outer wall of the fuel tank 30, and consequently, the column members 58 are attached inside the fuel tank 30 to support the outer wall thereof in a plurality of positions. As a result, the strength and the rigidity of the outer wall of the fuel tank 30 can be increased. With this arrangement, expansion and shrinkage of the fuel tank 30 can be prevented while maintaining the strength against shock applied thereto.

In addition, in order to correspond to the expansion and shrinkage of the outer wall of the fuel tank 30, dimensional change preventing members 70 can be provided in the column members 58.

The beam members 60 can be attached to predetermined positions of the inner surface of the outer wall of the fuel tank 30 while connecting the column members 58 therewith. In order to provide the lightweight beam members 60 with good rigidity, they can be formed to have a U-shaped cross-section or a tubular cross-section.

In addition, as shown in FIG. 3, a baffle plate 72 can be formed integrally with the beam member 60. With this arrangement, waving of the fuel in the fuel tank 30 can be prevented to restrain noise caused by the flow thereof.

Furthermore, in order to correspond to the expansion and shrinkage of the outer wall of the fuel tank 30, the dimensional change preventing members 70 can be provided in the beam member 60, similarly to the column members 58. With this arrangement, the distortion of the fuel tank 30 can be canceled.

The built-in part 28 can be composed of a thermoplastic synthetic resin exhibiting resistance against fuel oil, such as polyacetal, a high density polyethylene (HDPE), etc. With this arrangement, the strength of the fuel tank 30 can be improved, and the rigidity of the built-in part 28 attached inside the fuel tank 30 is prevented from being lowered due to swelling with the fuel oil.

The valves 36 attached inside the valve attaching sections 64 provided in the upper parts of the column members 58 on both side ends of the built-in part 28 are connected to each other with the tube 68. And another tube 68 is attached to one of the valves 36, and the tube connector 34 is attached to an end of the tube 68. With this arrangement, gas can be fed from the valve 36 provided on the right end of FIG. 3 to the tube connector 34 via the valve 36 on the left end thereof.

And, as shown in FIG. 3, the temporal holding connector 32 is provided in the beam member 60 of the built-in part 28, and the tube connector 34 is attached to the temporal holding connector 32.

As shown in FIG. 5 through FIG. 7, the temporal holding connector 32 is formed integrally with the beam member 60. With this arrangement, the temporal holding connector 32 can be formed with the molding of the built-in part 28, thereby facilitating the production of the fuel tank, and omitting assembling work of the temporal holding connector 32 to the beam member 60 to improve the productivity.

The temporal holding connector 32 is arranged such that a connection section 74 projects laterally from a side wall of the beam member 60, and a tube attaching section 76 bends vertically and downwardly. The tube connector 34 is attached to the tube attaching section 76.

The temporal holding connector 32 is provided away from the positions in which the valves 36 are attached such that the tube 68 adapted to attach the connector 34 does not loosen, and the tube 68 does not contact the parison.

And, by attaching the tube connector 34 to the temporal holding connector 32, the end of the tube connector 34 can be closed with the temporal holding connector 32 so that dust and dirt can be prevented from intruding from the end of the tube connector 34 during blow molding and during assembling. Therefore, no dustproof cap is required in the tube connector 34.

In the temporal holding connector 32 of the first embodiment of the present invention, a first flat part and a second flat part can be formed in a part contacting a seal ring, similarly to a later-describing second embodiment.

Next, the tube connector 34 will be explained with reference to FIG. 8 through FIG. 10.

The tube connector 34 has a tube attaching section 78 to which the tube 68 is to be attached and a cap nipple attaching section 80 that is formed at right angles to the tube attaching section 78, and the tube attaching section 78 and the cap nipple attaching section 80 respectively have a pile-like configuration, and through holes thereof are interconnected with each other.

A plurality of ribs 82 are formed around the tube attaching section 78 into a cylindrical configuration. When the tube 68 is fitted on the tube attaching section 78, the ribs 82 cut into the tube 68, and consequently, the tube 68 is attached to the tube connector 34 securely with good sealing properties.

Before blow molding, the cap nipple attaching section 80 is attached to the above-described temporal holding connector 32, and the tube attaching section 78 is inserted in the cap nipple attaching section 80.

A seal ring 94 is attached inside the cap nipple attaching section 80 to provide a seal between the tube attaching section 78 and the cap nipple attaching section 80.

Next, the valve 36 will be explained with reference to FIG. 11 and FIG. 12.

A float 86 is attached inside a cylindrical valve main body 88 so as to slide upwardly and downwardly. An upper end 90 of the float 86 is tapered into a conical configuration, and is arranged such that when the float 86 is elevated, the upper end 90 fits in an opening 92 provided in a valve ceiling 94 on an upper side of the valve main body 88.

A valve cap 96 is welded on the upper side of the valve ceiling 94. A tube attaching section 98 projects from a side surface of the valve cap 96 obliquely downwardly. In the valve 36 provided on the left side in FIG. 3, two tube attaching sections 98 are formed, the tube 68 adapted to be connected to the tube connector 34 is attached to one of the tube attaching sections 98, whereas the tube 68 adapted to be attached to the valve 36 provided on the right side in FIG. 3 is attached to the other tube attaching section 98.

A plurality of inlet holes 100 are provided in the valve main body 88, and when the fuel level in the fuel tank 30 is elevated, fuel enters via the inlet hole 100, and the float 86 is raised to close the opening 92, thereby preventing the fuel from flowing outwardly. When the fuel level is lowered, the float 86 moves downwardly to open the opening 92, thereby discharging the fuel gas and air from the fuel tank 30 or feeding air from the outside thereof.

As shown in FIG. 3, it is preferable that the valves 36 are provided in two positions in the longitudinal or widthwise direction of the fuel tank 30. In this case, if the fuel in the fuel tank 30 waves due to the inclination of the vehicle body or the vibrations thereof under running, one of the two valves opens so that gas can be discharged from the fuel tank at any time, whereby the air pressure in the fuel tank 30 can be kept uniform, the fuel tank 30 can be prevented from expanding due to the increment of the air pressure therein, and being caved in due to the decrement of the air pressure therein.

As shown in FIG. 3, two valves 36 are connected to each other with one tube 68, and another tube 68 to which the tube connector 34 is connected is attached to one of the two valves 36, and consequently, if one of the valves 36 is opened, gas can be fed to the tube connector 34 via the tube 68 connected thereto, whereby gas can be discharged from the fuel tank 30, and another gas can be fed therein.

The tank cap 38 (FIG. 13) is attached to the pump unit attaching opening 48 adapted to attach the pump unit (not shown) in the fuel tank 30 (FIG. 4).

The tank cap 38 has a flat plate-like main body 102 adapted to close the pump unit attaching opening 48, an inside tube attaching section 104 provided in the main body 102 inside thereof, and an outside tube attaching section 106 provided in the main body 102 outside thereof. The tank cap 38 is screwed to the pump unit attaching opening 48 with a cap attaching screw 108. A seal ring 110 is closely inserted between an outer periphery of the main body 102 and the pump unit attaching opening 48.

When the fuel tank 30 is molded with the built-in part 28 attached therein, the tube connector 34 is detached from the temporal holding connector 32 by inserting hands from the pump unit attaching opening 48. And the tube connector 34 is inserted in the inside tube attaching section 104, a connector holding section 112 is attached by sliding the same, and the tank cap 38 is attached to the pump unit attaching opening 48. Then, the tube 68 is attached to the outside tube attaching section 106, and a canister (not shown), etc. is connected thereto.

Thus, the gas within the fuel tank 30, such as the fuel gas, air, etc., can be discharged from the fuel tank 30, and when air pressure within the fuel tank 30 becomes negative, air can be fed to the fuel tank 30.

Next, a second embodiment of the present invention will be explained. The second embodiment differs from the first embodiment in configuration of the temporal holding connector and the tube connector, but is substantially equal to the first embodiment in other parts. Therefore, only the different parts will be explained, whereas the explanation of other equal parts will be omitted.

As shown in FIG. 14, in the second embodiment of the present invention, a temporal holding connector 44 is formed integrally with the beam member 60, similarly to the first embodiment.

As shown in FIG. 15, the temporal holding connector 44 has a connecting section 160 that laterally projects from the beam member 60 integrally therewith, and a tube attaching section 114 which is provided to extend from an end of the connecting section 160 in parallel to the longitudinal direction of the beam member 60 of the built-in part 42. The tube connector 46 is attached to this tube attaching section 114. The temporal holding connector 44 is provided away from the position in which the valves 36 are attached such that the tube 68 adapted to attach the tube connector 46 does not loosen, and the tube 68 does not contact the parison during blow molding.

With this arrangement, the tube connector 46 adapted to be attached to the temporal holding connector 44 can extend in parallel to the longitudinal direction of the beam member 60. Therefore, by moving the tube connector 46 in parallel to the longitudinal direction of the beam member 60, the tube connector 46 can be detached from the temporal holding connector 44 with ease. In addition, the tube connector 46 does not protrude downwardly of the beam member 60, and upon detaching the tube connector 46, it does not contact the fuel tank 30.

And, by attaching the tube connector 46 to the temporal holding connector 44, the end of the tube connector 46 can be closed with the temporal holding connector 44 so that dust and dirt can be prevented from intruding from the end of the tube connector 46 during blow molding and during assembling. Therefore, no dustproof cap is required in the tube connector 46.

As shown in FIG. 18 through FIG. 21, the tube connector 46 has a tube attaching section 114, and a cap nipple attaching section 116 are formed straight. A seal ring 118 is attached inside the cap nipple attaching section 116 When the tube connector 46 is attached to the temporal holding connector 44, the seal ring 118 contacts the tube attaching section 114. FIGS. 20 and 21 are sectional views along line B-B of FIG. 19.

As shown in FIG. 15 and FIG. 17, the tube attaching section 114 of the temporal holding connector 44 has a groove 120. FIG. 17 is a cross-sectional view taken along line A-A of FIG. 15. The groove 120 is provided to prevent sinking of the tube attaching section 114 and make the same lightweight. As shown in FIG. 20, the groove 120 is formed in the tube attaching section 114 so as not to contact the seal ring 118 (O ring) attached inside the tube connector 46 when the tube connector 46 is attached to the tube attaching section 114.

When the seal ring 118 contacts an open end of the groove 120, the rubber seal ring 118 deforms and cuts into the groove 120, and consequently, when the tube connector 46 is attached to the inside tube attaching section 104 of the tank cap 38, the sealing properties of the seal ring 118 may be decreased, but, as shown in FIG. 20, the seal ring 118 does not contact the open end of the groove 120 so as not to deform, and consequently, when the tube connector 46 is attached to the tank cap 38, sealing properties can be effected between the tank cap 38 and the tube connector 46.

As shown in FIG. 21, the groove 120 can be provided in two or more positions. Where two or more grooves are provided, they are formed in the tube attaching section 114 so as not to contact the seal ring 118 (O ring) mounted in the tube connector 46 upon attaching the tube connector 46 to the tube attaching section 114 of the temporal holding connector 44.

In addition, as shown in FIG. 16, flat parts are longitudinally formed in an outer surface of the tube attaching section 114 of the temporal holding connector 44, in which a parting line (PL) is formed, and in which the tube connector 46 contacts the seal ring 114. The parting line (PL) is a level difference generated in a joint between mold members upon molding the temporal holding connector 44.

In the tube attaching section 114, a line-shaped rib is formed in the longitudinal direction thereof as the parting line (PL). Therefore, when the sealing ring 118 (O ring) attached inside the tube connector 46 contacts the rib along the parting line (PL) upon attaching the tube connector 46 to the tube attaching section 114, the seal ring 118 is pushed to deform, and consequently, when the tube connector 46 is attached to the inside tube attaching section 104, the sealing properties may be lowered.

In order to overcome the above-described problem, in accordance with the present embodiment, as shown in FIG. 16, a first flat part 122 and a second flat part 124 are provided in the tube attaching section 114 by cutting the outer surface thereof along the parting line (PL), to which the tube connector 46 is adapted to be attached. By virtue of this first flat part 122 and the second flat part 124, the parting line (PL) does not protrude from the outer surface of the tube attaching section 114, and consequently, when the tube connector 46 is attached to the tube attaching section 114, the seal ring 118 mounted inside the tube connector 46 does not contact the parting line (PL) so as not to deform, whereby when the tube connector 46 is attached to the tank cap 38, the sealing properties between the tank cap 38 and the tube connector 46 can be ensured.

As shown in FIG. 14, in the second embodiment of the present invention, a temporal holding connector 44 is formed integrally with the beam member 60, similarly to the first embodiment.

Next, the blow molding method of the fuel tank 30 with the built-in part 28 will be explained with reference to FIG. 22.

First, the built-in part 28 is held with a holding rod 126, and is located inside a blow molding mold 128 that is in the open state. In FIG. 22, the holding rod 126 is lowered. When the blow molding is started, the holding rod 126 is raised to hold the built-in part 28. Then, a parison 130 is lowered to position the built-in part 28 inside the parison 130.

Then, as shown in FIG. 22, a first pinch plate 132 is slid to hold a lower end of the parison 130 along with the holding rod 126. And, a plurality of pressing pins 134 provided in the blow molding mold 128 are slid to press the parison 130 between contacting sections 136 of the built-in part 28 and the pressing pins 134.

At this time, an inner surface of the parison 130 is still in the molten state so that ribs provided in the contacting sections 136 protrude into the inner surface of the parison 130 to enable fusion of the contacting sections 136 and the parison 130. Since the built-in part 28 is securely held with the holding rod 126, the built-in part 28 can be securely attached to a predetermined position of the outer wall of the fuel tank 30.

Then, as shown in FIG. 22, the holding rod 126 is lowered to be separated from the blow molding mold 128, and a second pinch plate 138 is slid to close the parison 130. And the blow molding mold 128 is closed and the parison 130 is cut off with a slide cutter 140. When the blow molding mold 128 is closed, the pressing pins 134 continuously press the parison 130 so that the built-in part 28 can be held in a predetermined position.

Then, air is blown into the interior of the parison 130 via an air nozzle 142, and the outer surface of the parison 130 is pressed against the blow molding mold 128, thereby forming the fuel tank 30. At this time, end surfaces of the pressing pins 134 and an inner surface of a cavity of the blow molding mold 128 can be located on the same level.

Next, the blow molding mold 128 is opened, and the fuel tank 30 is removed therefrom.

In this manner, the built-in part 28 can be attached to the fuel tank 30. After blow molding, the tube connector is detached from the temporal holding connector, and is attached to the inside tube attaching section 104 of the tank cap 38.

A third embodiment of the present invention will be explained with reference to FIG. 23.

The configuration of the fuel tank of the third embodiment differs from that of the preceding embodiments. As shown, the interior of the fuel tank 30 is divided into a main portion 30a and a sub-portion 30b located on the opposite side of the main portion 30a. The fuel tank of this type is generally called "saddle-shaped tank". Fuel on the side of the main portion 30a is pumped up with a fuel pump 146, whereas fuel on the side of the sub-portion 30b is sucked with a sub-suction 148 and fed to the fuel pump 146 via a tube 68.

The tube 68 adapted to connect the sub-suction 148 and the fuel pump 146 is attached to a built-in part 28, and is assembled with the blow molding of the fuel tank 30.

Upon the blow molding of the fuel tank 30, a tube connector 150 attached to an end of the tube 68 is temporarily held with a temporal holding connector 152 that is provided integrally with the built-in part 28, similarly to the preceding embodiments.

After the blow molding of the fuel tank 30, the tube connector 150 is detached from the temporal holding connector 152, and is attached to the fuel pump 146 adapted to be assembled to an opening of the fuel tank 30. Consequently, the fuel on the side of the sub-portion 30b can be fed to the fuel pump 146.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A fuel tank for a motor vehicle, which is formed by blow molding for attachment of a built-in part in an interior thereof, and of which an outer wall is composed of a synthetic resin and has an opening, wherein
a functional part adapted to discharge fluid from the interior of the fuel tank or feed fluid therein is attached to the built-in part, a tube adapted to discharge fluid from the interior of the fuel tank or feed fluid therein is connected to said functional part, a tube connector is attached to an end of said tube, and
a temporal holding connector is formed integrally with the built-in part such that said tube connector is attached to said temporal holding connector, and after blow molding, said tube connector is detached from said temporal holding connector and is attached to one of a tank cap adapted to close the opening of the fuel tank, and a fuel pump adapted to be assembled to the opening of the fuel tank, wherein
the built-in part has a plurality of column members adapted to be fused to an inner surface of an outer wall of the fuel tank, thereby attaching the built-in part thereto, and beam members adapted to connect one of said column members integrally, and said functional part is attached to an upper part of said column member, and
said temporal holding connector has a connecting section adapted to be connected to said beam member of the built-in part, and a tube attaching section in which said tube connector extending from said connecting section is adapted to be inserted, said tube connector has a seal ring in an interior thereof, and said temporal holding connector has a flat part in an outer surface of said tube attaching section in a longitudinal direction thereof along a parting line, which contacts said seal ring when said tube connector is attached to said temporal holding connector.

2. A fuel tank for a motor vehicle as claimed in claim 1, wherein said tube attaching section is provided substantially parallel to the longitudinal direction of said beam member.

3. A fuel tank for a motor vehicle as claimed in claim 1, wherein said opening is an attaching hole adapted to attach the fuel pump provided in the fuel tank, said tank cap has an inside tube attaching section adapted to attach said tube connector to an inner surface of said tank cap, and an outside tube attaching section interconnected with said inside tube attaching section and projecting from an outer surface of said tank cap.

4. A fuel tank for a motor vehicle as claimed in claim 1, wherein said functional part comprises two valves, the two valves are attached to two positions on respective sides of the fuel tank in one of a longitudinal direction and a widthwise direction thereof, and said two valves are connected to each other with said tube, and another tube to which said tube connector is attached at an end thereof is attached to one of said two valves.

5. A fuel tank for a motor vehicle as claimed in claim 1, wherein said functional part is a valve, and said valve is attached to the built-in part so as to be located on an upper side of the fuel tank.

6. A fuel tank for a motor vehicle as claimed in claim 1, wherein said functional part is a valve, and said valve is composed of one of polyamide and polyacetal, said tube is composed of polyamide, and the fuel tank is composed of a high density polyethylene (HDPE).

7. A fuel tank for a motor vehicle, which is formed by blow molding for attachment of a built-in part in an interior thereof, and of which an outer wall is composed of a synthetic resin and has an opening, wherein a functional part adapted to discharge fluid from the interior of the fuel tank or feed fluid therein is attached to the built-in part, a tube adapted to discharge fluid from the interior of the fuel tank or feed fluid therein is connected to said functional part, a tube connector is attached to an end of said tube, and a temporal holding connector is formed integrally with the built-in part such that said tube connector is attached to said temporal holding connector, and after blow molding, said tube connector is detached from said temporal holding connector and is attached to one of a tank cap adapted to close the opening of the fuel tank, and a fuel pump adapted to be assembled to the opening of the fuel, wherein the built-in part has a plurality of column members adapted to be fused to an inner surface of an outer wall of the fuel tank, thereby attaching the built-in part thereto, and beam members adapted to connect one of said column members integrally, and said functional part is attached to an upper part of said column member, and said temporal holding connector has a connecting section adapted to be connected to said beam member of the built-in part, and a tube attaching section which extends from said connecting section for insertion of said tube connector, said tube connector has a seal ring in an interior thereof, and said temporal holding connector has a groove in said tube attaching section, which does not contact said seal ring when said tube connector is attached to said temporal holding connector.

8. A fuel tank for a motor vehicle as claimed in claim claim 7, wherein said tube attaching section is provided substantially parallel to the longitudinal direction of said beam member.

9. A fuel tank for a motor vehicle as claimed in claim 7, wherein said functional part comprises two valves, the two valves are attached to two positions on respective sides of the fuel tank in one of a longitudinal direction and a widthwise direction thereof, and said two valves are connected to each other with said tube, and another tube to which said tube connector is attached at an end thereof is attached to one of said two valves.

10. A fuel tank for a motor vehicle as claimed in claim 7, wherein said functional part is a valve, and said valve is composed of one of polyamide and polyacetal, said tube is composed of polyamide, and the fuel tank is composed of a high density polyethylene (HDPE).

11. A fuel tank for a motor vehicle as claimed in claim 7, wherein said opening is an attaching hole adapted to attach the fuel pump provided in the fuel tank, said tank cap has an inside tube attaching section adapted to attach said tube connector to an inner surface of said tank cap, and an outside tube attaching section interconnected with said inside tube attaching section and projecting from an outer surface of said tank cap.

12. A fuel tank for a motor vehicle as claimed in claim 11, wherein said functional part is a valve, and said valve is attached to the built-in part so as to be located on an upper side of the fuel tank.

* * * * *